United States Patent
Liang

(10) Patent No.: US 10,565,420 B2
(45) Date of Patent: Feb. 18, 2020

(54) CAPACITIVE SENSING CIRCUIT

(71) Applicant: SHENZHEN GOODIX TECHNOLOGY CO., LTD., Shenzhen (CN)

(72) Inventor: Yu An Liang, Shenzhen (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 48 days.

(21) Appl. No.: 15/784,075

(22) Filed: Oct. 13, 2017

(65) Prior Publication Data
US 2018/0089490 A1 Mar. 29, 2018

Related U.S. Application Data

(63) Continuation of application No. PCT/CN2016/100452, filed on Sep. 27, 2016.

(51) Int. Cl.
*G06K 9/00* (2006.01)

(52) U.S. Cl.
CPC .................. *G06K 9/0002* (2013.01)

(58) Field of Classification Search
CPC .................................................. G06K 9/0002
See application file for complete search history.

(56) References Cited

U.S. PATENT DOCUMENTS 6,636,053 B1   10/2003  Gozzini
9,164,137 B2   10/2015  Page et al.
(Continued)

FOREIGN PATENT DOCUMENTS

CN   102200869 A   9/2011
CN   102954753 A   3/2013
(Continued)

OTHER PUBLICATIONS

International Search Report for International Application No. PCT/CN2016/100452, Applicant: Shenzhen Goodix Technology Co., Ltd., dated Jun. 30, 2017, 5 pages.

*Primary Examiner* — Pinalben Patel

(57) ABSTRACT

A capacitive sensing circuit (10) includes a sample-and-hold circuit (SH) coupled to the contact capacitor (Cf); an integrating circuit (100) coupled to the sample-and-hold circuit (SH); a comparator (comp) coupled to the integrating circuit (100); a counter (cntr) coupled to a comparison output terminal and configured to accumulate a cumulative number ($N_{out}$) of transitions of the comparator (comp); a voltage boost circuit (104) coupled to the integrating circuit (100) and configured to add a specific value ($V_k$) to an integrating output voltage ($V_{out}$) when the comparator (comp) performs a transition; and a logic circuit (102) coupled to the counter (cntr), where the logic circuit (102) outputs an integration time ($T_{out}$) of the integrating circuit (100) when the cumulative number is equal to a predetermined number ($N_{th}$), and the integration time ($T_{out}$) correlates with a capacitance value of the contact capacitor (Cf).

7 Claims, 1 Drawing Sheet

(56) References Cited

U.S. PATENT DOCUMENTS

| | | | |
|---|---|---|---|
| 9,710,690 B1* | 7/2017 | Carling | G06K 9/00087 |
| 9,740,343 B2* | 8/2017 | Hotelling | G06F 3/044 |
| 2002/0181748 A1 | 12/2002 | Morimura et al. | |
| 2003/0016024 A1* | 1/2003 | Teranuma | G06K 9/0002 |
| | | | 324/519 |
| 2004/0096061 A1* | 5/2004 | Yano | G06K 9/0002 |
| | | | 380/59 |
| 2007/0092117 A1 | 4/2007 | Qi | |
| 2008/0258959 A1 | 10/2008 | Trifonov et al. | |
| 2010/0102831 A1 | 4/2010 | Kuang | |
| 2014/0176482 A1 | 6/2014 | Wen et al. | |
| 2015/0162932 A1 | 6/2015 | Page et al. | |
| 2016/0328592 A1 | 11/2016 | Li | |
| 2016/0350577 A1* | 12/2016 | Yang | G06K 9/00053 |
| 2017/0116452 A1* | 4/2017 | Wang | G06K 9/0002 |
| 2017/0124370 A1* | 5/2017 | He | G06K 9/0012 |
| 2017/0235993 A1* | 8/2017 | Xu | G06F 3/0416 |
| | | | 345/174 |
| 2017/0308730 A1* | 10/2017 | Sundblad | G06K 9/0002 |
| 2018/0032779 A1* | 2/2018 | Yang | G06K 9/0002 |
| 2018/0349662 A1* | 12/2018 | Lin | G06K 9/0002 |
| 2019/0014274 A1* | 1/2019 | Lin | H04N 5/357 |
| 2019/0026521 A1* | 1/2019 | Du | G06K 9/0002 |

FOREIGN PATENT DOCUMENTS

| | | |
|---|---|---|
| CN | 102957404 A | 3/2013 |
| CN | 103138734 A | 6/2013 |
| CN | 103714330 A | 4/2014 |
| CN | 103837163 A | 6/2014 |
| EP | 1260936 A2 | 11/2002 |
| EP | 1308878 A2 | 5/2003 |
| KR | 20160087389 A | 7/2016 |

\* cited by examiner

CAPACITIVE SENSING CIRCUIT

CROSS-REFERENCE TO RELATED APPLICATIONS

This application is a continuation of International Application No. PCT/CN2016/100452, filed on Sep. 27, 2016, the disclosure of which is hereby incorporated by reference in its entirety.

TECHNICAL FIELD

The present disclosure relates to a capacitive sensing circuit, and in particular, to a capacitive sensing circuit with a simple circuit configuration.

BACKGROUND

With the ever-changing technology, more portable electronic devices such as mobile phone, digital camera, tablet computer and notebook computer have become a necessary tool for people's lives. Since a portable electronic device is generally used by an individual and it has a certain property of privacy, the data such as a telephone book, a photograph, personal information and the like stored therein is privately owned. If the electronic device is lost, the data may be used by others, resulting in unnecessary losses. While a manner of password protection has been used at present to avoid that the electronic device is used by others, a password is easy to be leaked or deciphered with lower security. Moreover, a user is required to remember the password when using an electronic device. If the password is forgotten, it will cause a lot of inconvenience. Therefore, a personal fingerprint identification system is developed currently to achieve identity authentication, so as to enhance data security.

In general, a capacitive sensing circuit is used to receive finger contact in a fingerprint identification system. The capacitive sensing circuit is used to accept finger contact and form a contact capacitor with a finger. The capacitive sensing circuit may convert a capacitance value of the contact capacitor into an analog voltage signal, which is converted into a digital voltage signal and then sent to a fingerprint determination module at a back end to determine finger ridges (Finger Ridge) or finger valleys (Finger Valley) of a fingerprint corresponding to the capacitive sensing circuit. In other words, the analog voltage signal is converted into the digital voltage signal through an analog-to-digital converter (Analog to Digital Convertor, ADC). However, a circuit structure of the analog-to-digital converter is complex and occupies a large circuit area, increasing production costs and consuming higher power. Therefore, providing a capacitive sensing circuit with simple circuit structure, small circuit area, low cost and low power consumption has become one of goals pursued in the industry.

SUMMARY

A primary objective of the present disclosure is to provide a capacitive sensing circuit with a simple circuit structure.

To solve the above technical problem, the present disclosure provides a capacitive sensing circuit, including a sample-and-hold circuit coupled to the contact capacitor; an integrating circuit including an integrating input terminal coupled to the sample-and-hold circuit and an integrating output terminal for outputting an integrating output voltage; a comparator including a first input terminal coupled to the integrating output terminal, a second input terminal for receiving a reference voltage, and a comparison output terminal; a counter coupled to the comparison output terminal and configured to accumulate a cumulative number of transitions of the comparator; a voltage boost circuit coupled to the integrating input terminal and configured to add a specific value to the integrating output voltage when the comparator performs a transition; and a logic circuit coupled to the counter, where the logic circuit outputs an integration time of the integrating circuit when the cumulative number is equal to a predetermined number, and the integration time correlates with a capacitance value of the contact capacitor.

Preferably, the logic circuit generates a control signal to terminate an integration operation of the integrating circuit when the cumulative number is equal to the predetermined number.

Preferably, the integration time is an elapsed time from start of the integration operation to termination of the integration operation of the integrating circuit.

Preferably, the sample-and-hold circuit includes a first switch having one end for receiving a positive voltage and the other end coupled to the contact capacitor; and a second switch having one end coupled to the contact capacitor and the other end coupled to the integrating input terminal, where the first switch is turned on and the second switch is turned off at a first time, and the first switch is turned off and the second switch is turned on at a second time.

Preferably, the integrating circuit includes an amplifier; a third switch coupled between the integrating input terminal and the integrating output terminal; an integrating capacitor coupled between the integrating input terminal and the integrating output terminal; and a fourth switch having one end coupled to the integrating capacitor and the other end coupled to the integrating output terminal.

Preferably, the third switch and the fourth switch are turned on when the capacitive sensing circuit is in a reset mode; and the third switch is turned off while the fourth switch is turned on when the integrating circuit performs an integration operation.

Preferably, the voltage boost circuit includes a boost capacitor coupled to the integrating input terminal; a fifth switch having one end for receiving a positive voltage and the other end coupled to the boost capacitor; and a sixth switch having one end for receiving a ground voltage and the other end coupled to the boost capacitor.

Preferably, the capacitive sensing circuit further includes a control circuit, where the control circuit controls that the fifth switch is turned on and the sixth switch is turned off at a first time; and the control circuit controls that the fifth switch is turned off and the sixth switch is turned on at a second time.

The capacitive sensing circuit provided by the present disclosure may convert charge stored in the contact capacitor into a time signal, which has the advantages of simple circuit structure, small circuit area, low cost and low power consumption.

DESCRIPTION OF EMBODIMENTS

In order to make objectives, technical solutions and advantages of the present disclosure clearer, a further detailed description on the present disclosure will be given below in combination with drawings and embodiments. It should be understood that, a specific embodiment described herein are merely used for illustrating the present disclosure, rather than limiting the present disclosure.

Figure 1:
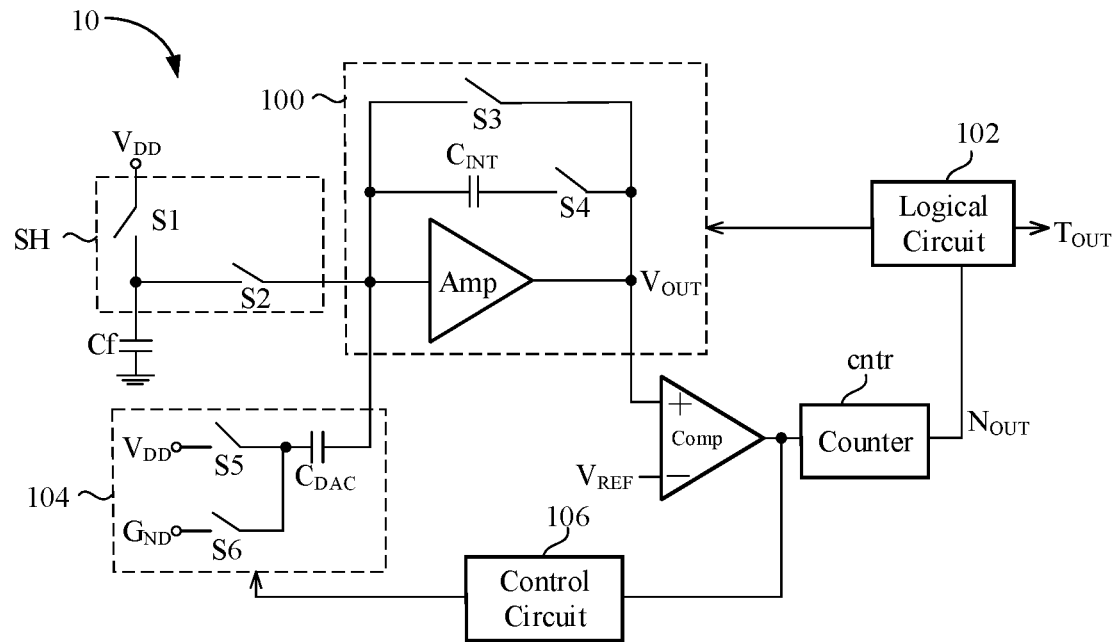
FIG. 1 is a schematic diagram of a capacitive sensing circuit according to an embodiment of the present disclosure.

A capacitive sensing circuit of the present disclosure converts charge stored in a contact capacitor into a time signal to accurately interpret a capacitance value of the contact capacitor and reduce circuit complexity of the capacitive sensing circuit. Specifically, referring to FIG. 1, it is a schematic diagram of a capacitive sensing circuit 10 according to an embodiment of the present disclosure. The capacitive sensing circuit 10 is configured to sense a contact capacitor Cf and includes a sample-and-hold circuit SH, an integrating circuit 100, a comparator comp, a counter (cntr), a voltage boost circuit 104, a logic circuit 102 and a control circuit 106. The integrating circuit 100 includes switches S3 and S4, an amplifier Amp and an integrating capacitor $C_{INT}$. An input terminal of the amplifier Amp is an integrating input terminal of the integrating circuit 100, and an output terminal of the amplifier Amp is an integrating output terminal of the integrating circuit 100, where the integrating output terminal is configured to output an integrating output voltage $V_{OUT}$. In addition, a positive input terminal (labeled with "+") of the comparator (comp) is coupled to the integrating output terminal of the integrating circuit 100 and configured to receive the integrating output voltage $V_{OUT}$, and a negative input terminal of the comparator (comp) (labeled with "−") is configured to receive a reference voltage $V_{REF}$. A counter (cntr) is coupled to a comparison output terminal of the comparator (comp) and configured to accumulate a cumulative number $N_{OUT}$ of transitions of the comparator comp. The logic circuit 102 may be implemented by a digital circuit and it is coupled between the counter (cntr) and the integrating circuit 100. When the cumulative number $N_{OUT}$ is equal to a predetermined number $N_{TH}$, the logic circuit 102 outputs an integration time $T_{OUT}$ of the integrating circuit, and the logic circuit 102 generates a control signal (not shown in FIG. 1) and sends it to the integrating circuit 100 to terminate the integration operation of the integrating circuit 100, where the integration time $T_{OUT}$ may represent/reflect a capacitance value of the contact capacitor Cf.

More specifically, the sample-and-hold circuit SH includes a switch S1 and a switch S2. One end of the switch S1 receives a positive voltage $V_{DD}$, and the other end of the switch S1 is electrically connected to the contact capacitor Cf; one end of the switch S2 is electrically connected to the contact capacitor Cf, and the other end of the switch S2 is electrically connected to the integrating input terminal of the integrating circuit 100. In addition, in the integrating circuit 100, the switch S3 is coupled between the integrating input terminal and the integrating output terminal of the integrating circuit 100, the integrating capacitor $C_{INT}$ is connected in series with the switch S4, and the integrating capacitor $C_{INT}$ and the switch S4 are also coupled between the integrating input terminal and the integrating output terminal of the integrating circuit 100. An operation mode of the integrating circuit 100 (or the capacitive sensing circuit 10) may be controlled by a conductive state of the control switches S3 and S4. For example, in a reset (Reset) mode of the capacitive sensing circuit 10, the switches S3 and S4 are turned on; in an integration mode of the capacitive sensing circuit 10 (i.e., when the integrating circuit 100 performs an integrating operation), the switch S3 is turned off and the switch S4 is turned on. If it needs to terminate the integration operation of the integrating circuit 100, the logic circuit 102 may generate a control signal to turn off the switch S4.

When the integrating circuit 100 performs an integration operation (i.e., the integrating circuit 100 is operated in an integration mode), the switch S1 is turned on (ON) and the switch S2 is turned off (OFF) during a first half period (corresponding to a first time) of a clock (Clock) period T, and the contact capacitor Cf is charged to a positive voltage $V_{DD}$; the switch S1 is turned off and the switch S2 is turned on during a second half period (corresponding to a second time) of the clock period T, and charge stored in the contact capacitor Cf flows to the integrating capacitor $C_{INT}$. In other words, when the integrating circuit 100 performs an integrating operation, the integrating output voltage $V_{OUT}$ decreases with time.

In addition, the voltage boost circuit 104 includes switches S5 and S6 and a boost capacitor $C_{DAC}$, where one end of the boost capacitor $C_{DAC}$ is coupled to the integrating input terminal and the other end is coupled to the switches S5 and S6. The switches S5 and S6 receive the positive voltage $V_{DD}$ and a ground voltage GND, respectively. In addition, the control circuit 106 is coupled between the voltage boost circuit 104 and the comparator output terminal of the comparator comp. When the integrating output voltage $V_{OUT}$ is less than a reference voltage $V_{REF}$, the comparator (comp) performs a transition, and the control circuit 106 generates a control signal (not shown in FIG. 1) to control the switches S5 and S6, such that a specific voltage value $V_K$ is added to the integrating output voltage $V_{OUT}$ (i.e., the integrating output voltage $V_{OUT}$ is increased to a voltage $V_{REF}+V_K$). More specifically, when the integrating output voltage $V_{OUT}$ is decreased to be less than the reference voltage $V_{REF}$, in a next clock period T', the control circuit 106 controls that the switch S5 is turned on during a first half period (corresponding to a first time) of the clock period T' and is turned off during a second half period (corresponding to a second time) of the clock period T', and the switch S6 is turned off during the first half period of the clock period T' and is turned on during the second half of the clock period T'. That is to say, the integrating output voltage $V_{OUT}$ is decreased due to integral, so that in an instant (i.e., during the clock period T') after that the integrating output voltage $V_{OUT}$ is less than the reference voltage $V_{REF}$, the integrating output voltage $V_{OUT}$ may be increased to the voltage $V_{REF}+V_K$. As a result, a value of the integrating output voltage $V_{OUT}$ will be limited between the voltage $V_{REF}+V_K$ and the voltage $V_{REF}$.

On the other hand, when the integrating circuit 100 performs an integration operation (i.e., the integrating circuit 100 is operated in an integration mode), the integrating output voltage $V_{OUT}$ is decreased to be less than the reference voltage $V_{REF}$, the comparator (comp) performs a transition and the value of the counter (cntr) is incremented by 1. In this case, the control circuit 106 generates a control signal, such that a specific voltage value $V_K$ is added to the integrating output voltage $V_{OUT}$ (i.e., the integrating output voltage $V_{OUT}$ is increased to the voltage $V_{REF}+V_K$). Then, the integrating circuit 100 continues to integrate based on the increased voltage $V_{REF}+V_K$, i.e., the integrating output voltage $V_{OUT}$ is decreased continuously from the voltage $V_{REF}+V_K$ until a next time that the integrating output voltage $V_{OUT}$ is less than the reference voltage $V_{REF}$ is achieved, the value of the counter (cntr) is incremented by 1 and the control circuit 106 generates a control signal again, so that a specific voltage value $V_K$ is added to the integrating output voltage $V_{OUT}$ again. The process is repeated until the logic circuit 102 determines that a cumulative number $N_{OUT}$ output by the counter (cntr) is equal to a predetermined number $N_{TH}$, and the logic circuit 102 generates a control signal to terminate the integration operation of the integrating circuit 100 and outputs an integration time $T_{OUT}$.

Since a capacitance value of the contact capacitor Cf is inversely proportional to the integration time $T_{OUT}$, the smaller the integration time $T_{OUT}$, the larger the capacitance value of the contact capacitor Cf for the same predetermined number $N_{TH}$. Therefore, a back end circuit (not shown in FIG. 1) of the capacitive sensing circuit 10 may determine the capacitance value of the contact capacitor Cf according to the integration time $T_{OUT}$.

Figure 2:
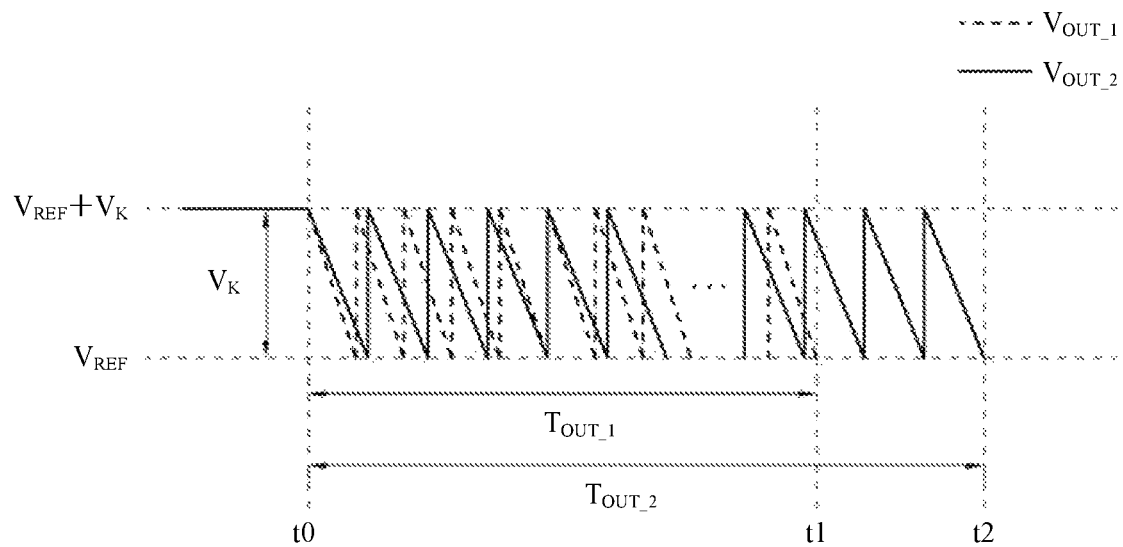
FIG. 2 is a waveform diagram of an integrating output voltage according to an embodiment of the present disclosure.

More specifically, referring to FIG. 2, it is a waveform diagram of an integrating output voltage $V_{OUT\_1}$ and an integrating output voltage $V_{OUT\_2}$ generated by a capacitive sensing circuit 10 for capacitive sensing of a contact capacitor Cf_1 and a contact capacitor Cf_2, respectively, where the contact capacitor Cf_1 has a different capacitance value from the contact capacitor Cf_2. The dotted line represents the waveform of the integrating output voltage $V_{OUT\_1}$, and the solid line represents the waveform of the integrating output voltage $V_{OUT\_2}$. As shown in FIG. 2, the capacitive sensing circuit 10 starts an integration operation (or starts entering an integration mode) at a time $t_0$. When the capacitive sensing circuit 10 perform a capacitive sensing on the contact capacitor Cf_1, as the integrating circuit 100 continues to integrate, the comparator (comp) performs a transition over and over again until a time $t_1$ is achieved, i.e., when a cumulative number $N_{OUT\_1}$ accumulated by the counter (cntr) (corresponding to the contact capacitor Cf_1) reaches a predetermined number $N_{TH}$, the logic circuit 102 outputs an integration time $T_{OUT\_1}$ (where the integration time $T_{OUT\_1}$ is a duration from the time $t_0$ that the integrating circuit 100 starts an integration operation to the time $t_1$ that the integrating circuit 100 terminates the integration operation). Similarly, when the capacitive sensing circuit 10 perform a capacitive sensing on the contact capacitor Cf_2, as the integrating circuit 100 continues to integrate, the comparator (comp) performs a transition over and over again until a time $t_2$ is achieved, i.e., when a cumulative number $N_{OUT\_2}$ accumulated by the counter (cntr) (corresponding to the contact capacitor Cf_2) reaches the predetermined number $N_{TH}$, the logic circuit 102 outputs an integration time $T_{OUT\_2}$ (where the integration time $T_{OUT\_1}$ is a duration from the time $t_0$ that the integrating circuit 100 starts an integration operation to the time $t_2$ that the integrating circuit 100 terminates the integration operation). In this case, a back end circuit of the capacitive sensing circuit 10 may determine capacitance values of the contact capacitors Cf_1 and Cf_2 according to the integration times $T_{OUT\_1}$ and $T_{OUT\_2}$, respectively.

In short, according to the present disclosure, a voltage boost circuit 104 and a control circuit 106 are used to limit a value of an integrating output voltage $V_{OUT}$ between a voltage $V_{REF}+V_K$ and a voltage $V_{REF}$; a counter (cntr) is used to calculate the number of transitions of a comparator comp; a logic circuit 102 is used to determine whether a cumulative number $N_{OUT}$ output by the counter (cntr) reaches a predetermined number $N_{TH}$. When the cumulative number $N_{OUT}$ reaches the predetermined number $N_{TH}$, the logic circuit 102 outputs an integration time $T_{OUT}$ and a back end circuit of a capacitive sensing circuit 10 may determine a capacitance value of a contact capacitor Cf according to the integration time $T_{OUT}$.

It is known that a capacitive sensing circuit needs to convert charge stored in a contact capacitor into an analog voltage signal and convert the analog voltage signal into a digital voltage signal through an analog-to-digital converter (Analog to Digital Convertor, ADC). However, a circuit structure of the analog-to-digital converter is complex and occupies a large circuit area. In contrast, the capacitive sensing circuit of the present disclosure converts charge stored in the contact capacitor into a time signal (i.e., an integration time $T_{OUT}$) without using an analog-to-digital converter, and a back end circuit may determine a capacitance value of the contact capacitor according to the integration time $T_{OUT}$ and then determine if there is a touch event, or determine finger ridges (Finger Ridge) or finger valleys (Finger Valley) of a fingerprint corresponding to a capacitive sensing circuit for fingerprint identification.

To sum up, a capacitive sensing circuit of the present disclosure may convert charge stored in a contact capacitor into a time signal without using a conventional analog-to-digital converter, and a capacitance value of the contact capacitor can be determined according to an integration time output by the capacitive sensing circuit of the present disclosure. Therefore, the capacitive sensing circuit of the present disclosure has advantages of simple circuit structure, small circuit area, low cost and low power consumption.

The foregoing descriptions are merely preferred embodiments of the present disclosure, rather than limiting the present disclosure, and any modifications, equivalent substitutions, improvements and the like, made within the spirit and principle of the present disclosure, are all encompassed in the protection scope of the present disclosure.

What is claimed is:

1. A capacitive sensing circuit configured to sense a contact capacitor, wherein the capacitive sensing circuit comprises:
   a sample-and-hold circuit coupled to the contact capacitor;
   an integrating circuit comprising:
      an integrating input terminal coupled to the sample-and-hold circuit; and
      an integrating output terminal for outputting an integrating output voltage;
   a comparator comprising:
      a first input terminal coupled to the integrating output;
      a second input terminal for receiving a reference voltage; and
      a comparison output terminal;
   a counter coupled to the comparison output terminal and configured to accumulate a cumulative number of transitions of the comparator;
   a voltage boost circuit coupled to the integrating input terminal and configured to add a specific value to the integrating output voltage when the comparator performs a transition; and
   a logic circuit coupled to the counter, wherein the logic circuit outputs an integration time of the integrating circuit when the cumulative number is equal to a predetermined number,
   wherein the integration time correlates with a capacitance value of the contact capacitor;
   wherein the sample-and-hold circuit comprises:
   a first switch having one end for receiving a positive voltage and the other end coupled to the contact capacitor; and
   a second switch having one end coupled to the contact capacitor and the other end coupled to the integrating input terminal,
   wherein the first switch is turned on and the second switch is turned off at a first time, and the first switch is turned off and the second switch is turned on at a second time.

2. The capacitive sensing circuit according to claim 1, wherein the logic circuit generates a control signal to terminate an integration operation of the integrating circuit when the cumulative number is equal to the predetermined number.

3. The capacitive sensing circuit according to claim 2, wherein the integration time is an elapsed time from start of the integration operation to termination of the integration operation of the integrating circuit.

4. The capacitive sensing circuit according to claim 1, wherein the integrating circuit comprises:
   an amplifier;
   a third switch coupled between the integrating input terminal and the integrating output terminal;
   an integrating capacitor coupled between the integrating input terminal and the integrating output terminal; and
   a fourth switch having one end coupled to the integrating capacitor and the other end coupled to the integrating output terminal.

5. The capacitive sensing circuit according to claim 4, wherein the third switch and the fourth switch are turned on when the capacitive sensing circuit is in a reset mode; and the third switch is turned off while the fourth switch is turned on when the integrating circuit performs an integration operation.

6. The capacitive sensing circuit according to claim 1, wherein the voltage boost circuit comprises:
   a boost capacitor coupled to the integrating input terminal;
   a fifth switch having one end for receiving a positive voltage and the other end coupled to the boost capacitor; and
   a sixth switch having one end for receiving a ground voltage and the other end coupled to the boost capacitor.

7. The capacitive sensing circuit according to claim 6, further comprising a control circuit, wherein the control circuit controls that the fifth switch is turned on and the sixth switch is turned off at a first time; and the control circuit controls that the fifth switch is turned off and the sixth switch is turned on at a second time.

* * * * *